United States Patent Office 3,661,861
Patented May 9, 1972

3,661,861
PROTECTIVE COATING WHICH IS PRODUCED BY REACTING MOISTURE WITH A PREPOLYMER MADE BY REACTING AN OXAZOLINE WITH A DIISOCYANATE
Jerry Hoyt Hunsucker, Terre Haute, Ind., assignor to Commercial Solvents Corporation, New York, N.Y.
No Drawing. Filed May 12, 1970, Ser. No. 36,681
Int. Cl. C08g 22/00
U.S. Cl. 260—77.5 R                 9 Claims

ABSTRACT OF THE DISCLOSURE

A prepolymer compound consisting of the reaction product of a mono-, bis- or tris-oxazoline with toluene diisocyanate dissolved in a solvent thereby providing an air-drying coating material which forms a smooth, continuous film by reaction with atmospheric moisture.

BACKGROUND OF THE INVENTION

This invention relates to protective coatings. In a particular aspect, this invention relates to an improved protective coating which forms a smooth, continuous film upon reaction with atmospheric moisture.

It is known to react 2-alkyl oxazolines with diisocyanates to form linear polymers which can be cross-linked by heating.

It is also known to react certain combinations of polyols with toluene diisocyanate to produce a one-component vehicle which is stable in the absence of moisture. A coating applied from this system becomes tack-free as soon as the solvent has evaporated and the film then continues to cure to its optimum properties by reaction of terminal isocyanate groups with atmospheric moisture to form a smooth, continuous film. Tertiary amines are sometimes added to such a coating just prior to application to catalyze the reaction with water.

SUMMARY OF THE INVENTION

It is an object of this invention to provide a protective coating.

It is another object of this invention to provide an improved protective coating which forms a smooth, continuous film by reaction with atmospheric moisture.

Other objects will be apparent to those skilled in the art from the description herein.

It is the discovery of the present invention to form a prepolymeric, water-reactive compound by reacting a member of the class of mono-, bis- or tris-oxazolines, or a mixture thereof, with an aromatic or aliphatic diisocyanate in a ratio of about 1 equivalent of said oxazoline per 1–4 moles of diisocyanate. The resulting prepolymer is useful as a vehicle in protective coatings, e.g. by dissolving in a suitable anhydrous solvent or solvent mixture and pigmenting as desired. When applied to a substratum, the solvent evaporates and the prepolymer polymerizes by reaction with atmospheric moisture to form a smooth, tough, adherent, continuous film.

DETAILED DISCUSSION

The oxazolines useful in preparing the compounds of the present invention correspond to the formula $$R-CH_2-C \begin{array}{c} N-C-CH_3 \\ | \\ CH_3 \\ O-CH_2 \end{array}$$

where R can be a saturated or unsaturated hydrocarbon radical of from 1 to 20 carbon atoms or the group $$\begin{array}{c} CH_3 \\ | \\ C-N \\ | \quad \searrow C-CH_2-X- \\ H_2C-O \quad R^1 \end{array}$$

wherein X is any divalent, or trivalent saturated or unsaturated aliphatic hydrocarbon group, including straight chain or branched chain, of from 1 to 32 carbon atoms; when X is divalent, $R^1$ is hydrogen and when X is trivalent, $R^1$ is the group $$\begin{array}{c} CH_3 \\ | \\ CH_3-C-N \\ | \quad \searrow C-CH_2-Y- \\ H_2C-O \end{array}$$

wherein Y is a saturated or unsaturated hydrocarbon radical of 16 carbon atoms.

Some of these compounds are commercially available or they can be prepared by reacting 2-amino-2-methyl-1-propanol with a monocarboxylic acid corresponding to the formula $RCH_2COOH$ by known methods, e.g. by the method of Purcell, U.S. Pat. 3,336,145, which is incorporated herein by reference thereto or with a dicarboxylic acid of from 4 to about 36 carbon atoms or with a tricarboxylic acid of up to about 54 carbon atoms, respectively, by the method of A. W. Campbell et al., U.S. Pat. 3,419,520, which is incorporated herein by reference thereto. The bis-oxazolines and tris-oxazolines thereby obtained correspond to the formula $$\left[ \begin{array}{c} CH_3 \\ | \\ CH_3-C-N \\ | \quad \searrow C-CH_2- \\ H_2C-O \end{array} \right]_{2-3} -X-H_{0-1}$$

The monocarboxylic acids suitable for forming the monooxazoline compounds include saturated and unsaturated fatty acids of from 2 to 22 carbon atoms, including mixtures thereof. Such acids are well-known in the art and include, but are not limited to, acetic, propionic, decanoic, lauric, linoleic, linolenic, oleic, stearic, behenic, etc. They are commercially available and the usual commerical grades, including the crude materials, are suitable for preparing the oxazoline compounds used in the preparation of the water-reactable prepolymer.

Dicarboxylic acids suitable for preparing the bisoxazolines include, but are not limited to, acids of from 4 to 10 carbon atoms, viz., succinic, glutaric, adipic, pimelic, suberic, azelaic, and sebacic. Also the dimer of $C_{18}$ unsaturated fatty acids is a suitable and preferred dicarboxylic acid. Dimerized acids are known to those skilled in the art. They are described in, for example, Technical Bulletin No. 438C, published by Emery Industries, Inc., Cincinnati, Ohio.

The structure of dimer acids, shown schematically below, is essentially that of a long-chain dicarboxylic acid with two or more alkyl side chains ($R_2$ and $R_3$). It appears to contain at least one ethylenic bond. Also within the molecule is the linkage at Z resulting from the polymerization of the two unsaturated fatty acid molecules that form dimer acid. The exact nature of the linkage is undetermined. It may be as simple as a single carbon-to-carbon bond, or as complex as a cyclic-structure. The total number of carbon atoms is 36.

$$HO_2C-(CH_2)_y-Z-(CH_2)_x-CO_2H \quad \begin{array}{c} R_2 \quad R_3 \\ \searrow \swarrow \end{array}$$

The tricarboxylic acids suitable for preparing the water-reactable prepolymeric compounds include, but are not limited to, the trimer of $C_{18}$ unsaturated fatty acids. This trimerized acid is known to those skilled in the art and is described in the aforementioned Technical Bulletin No. 438C.

While not definitely established, the structure of trimer acid may be represented diagrammatically as shown below. It contains three or more alkyd side chains ($R_4$, $R_5$, $R_6$). Within the molecule, at W, are undetermined linkages resulting from the polymerization of the three unsaturated fatty acid molecules that form trimer acid. The total number of carbon atoms is 54.

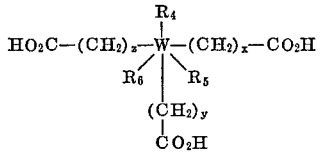

To prepare the prepolymeric compounds of the present invention, a member of the aforedescribed oxazolines, or a mixture of two or more members, is charged to a reaction vessel and heated to about 60–70° C., preferably about 60–65° C., and the diisocyanate, either as is, or diluted with about 1–1.5 volumes with dry toluene or xylene, is slowly added with agitation. The rate of addition is selected to be such that no appreciable increase in temperature, e.g. no increase over 70° C., occurs. The reaction period is extended for about 30 minutes after the final addition of diisocyanate. The resulting compound is then suitable for use as a clear, colorless coating or it can be pigmented with anhydrous pigments, many of which are known in the art to be suitable for use with isocyanate-type materials. These coatings are characterized by excellent adhesion and light color so they can be pigmented to any desired color.

A tertiary amine catalyst, many og which are known, e.g. triethylamine, can be added prior to use as desired to increase the rate of reaction with atmospheric moisture. The catalyst is generally used in about 1 part per 100 parts by weight based on the prepolymeric isocyanate compound.

Preferably the above coatings are applied in a relative humidity of 40% or higher or the drying rate is too slow. Hence it is preferable to raise the humidity of the atmosphere when it is near 40%.

The diisocyanates suitable for use in forming the prepolymers of this invention include the aromatic and aliphatic diisocyanates, including, but not limited to, toluene diisocyanate, methylene bis-(4-phenyl isocyanate), and the diisocyanate of the dimerized fatty acid described hereinbefore. Toluene diisocyanate, either the 2,4- or the 2,6- isomer, or a mixture thereof, is preferred. These diisocyanates are commercially available and the usual commercial materials are suitable.

In forming the prepolymer of this invention, the diisocyanate is generally used in a ratio of from about 1 to about 4 moles per oxazoline group per mole. The higher the quantity of diisocyanate, the harder and more brittle the film. Usually a ratio of from about 2 to about 3 per oxazoline group per mole is preferred. It is understood that the amount of toluene diisocyanate can be varied rather widely without departing from the concept of the present invention.

The invention will be better understood with reference to the following example. It is understood, however, that the examples are intended as illustrations only and it is not intended that the invention be limited thereby.

EXAMPLE 1

A bis-oxazoline was prepared by reacting 153 g. (0.19 mole) of dimerized $C_{18}$ unsaturated fatty acids obtained from Emery Industries, Inc., Cincinnati, Ohio, with 4.46 g. (6.5 mole) of 2-amino-2-methyl-1-propanol at a temperature of 170–180° C. for about 5 hours at which time the acid number was less than 5. The resulting compound was a bis-oxazoline corresponding to the general formula wherein X is 34.

A 35.1 g. portion of the product obtained in the above reaction was heated to about 60° C. and toluene diisocyanate (2,4- and 2,6- mixed isomers), 17.4 g., was added drop-wise over a period of about one hour. It was then cooled and diluted to about 50% by weight with dry toluene to yield a solution having a color of 8 (Gardner scale), a viscosity of H–I (Gardner) and containing 9.74% by weight of free (unreacted) isocyanate radical.

A film was prepared by drawing down on glass with a draw-down bar, a 1.5 mil thick wet film in a 75% relative humidity atmosphere. It was dry to the touch in 12 minutes and was clear and colorless. After 60 minutes the Sward hardness was 20 and after 24 hours, the hardness was 28.

The foregoing product was determined to be suitable for the production of an air-drying coating by formulating it with suitable color agents and applying to an article to be coated in an atmosphere containing water vapor.

EXAMPLE 2

Octa-methylene bis(4,4-dimethyl-2-oxazoline) was prepared from sebacic acid and 2-amino-2-methyl-1-propanol (AMP). To 508 g. of this compound there was added drop-wise over a period of ½–1 hour at a temperature of 60–65° C., 104.4 g. of 2,4-toluene diisocyanate (TDI) dissolved in 155 g. of dry toluene, with continued agitation. The agitation and heating were continued for about 30 minutes, at which time the reaction was determined to be complete. The solution was allowed to cool and a ½ mil draw-down was made on glass. The film was dry in 12 minutes and at the end of 1 hour it had a Sward hardness of 40.

EXAMPLE 3

The experiment of Example 2 was repeated in all essential details except that a 1½ mil film was drawn down on glass. It was clear and colorless and after 1 hour had a Sward hardness of 68. After 2 hours, it possessed good solvent resistance to methyl isobutyl ketone, which softened but did not remove the film.

EXAMPLE 4

A tris-oxazoline was prepared from AMP, 85.4 g., and 259 g. of the trimer of $C_{18}$ unsaturated acids (Trimer Acid 1040, Emery Industries, Inc.). The resulting product was reacted with toluene diisocyanate in accordance with the procedure of Example 1 to yield a product having 9.46% by weight unreacted isocyanate radical. A 1.5 mil wet film on glass was clear and colorless and dry to the touch after 5 minutes. The Sward hardness was 20 after 1 hour, and 28 after 24 hours.

EXAMPLE 5

There were charged to a reaction vessel, 30.8 g. of hexamethylene bis(4,4-dimethyl)-2-oxazoline made from AMP and suberic acid, and 65.6 g. toluene. The mixture was heated to about 50–60° C. and 34.8 g. toluene diisocyanate was added drop-wise in about 10 minutes. Heating was continued for 15 minutes at 50–60° C. and the mixture was then allowed to cool to room temperature. A film of 0.003 mil thickness was drawn down on steel Q panel. It dried in 5 minutes at 70% humidity, forming a smooth glossy film having a Sward hardness after 10 minutes of drying time of 28.

EXAMPLE 6

A mixture of mono-oxazoline, bis-oxazoline and tris-oxazoline was prepared by mixing 153 g. (0.25 mole) of dimerized $C_{18}$ fatty acid (which consisted of 75% of the dimer, 22% of the trimer and 3% of monobasic acids) with 44.6 g. (0.5 mole) of 2-amino-2-methyl-1-propanol.

The reactants were mixed in a flask equipped with stirrer, thermometer, and nitrogen sparge. The temperature was raised to 180–185° C. and maintained until the acid value was less than 10.

The resulting oxazoline mixture is reacted with TDI in a ratio of 3 moles of TDI per oxazoline equivalent in the mixture. The oxazoline equivalent is determined by known methods. The resulting mixture forms a tough, adherent coating when applied as a film to a substratum and exposed to atmospheric moisture.

EXAMPLE 7

A series of mono-oxazolines are prepared from AMP and propionic acid, caproic acid, nonoic acid, lauric acid, decenoic acid, linolenic acid, linoleic acid, oleic acid, and behenic acid, respectively, are reacted with TDI in a mole ratio of 1:2. The resulting compositions form tough, adherent coatings when applied to substrata and exposed to atmospheric moisture.

EXAMPLE 8

The experiment of Example 1 is repeated in all essential details except that methylene bis(4-phenyl isocyanate) is substituted for toluene diisocyanate on a mole-for-mole basis. There is obtained a prepolymer which is polymerizable by reaction with moisture.

EXAMPLE 9

The experiment of Example 1 is repeated in all essential details except that an equivalent of the diisocyanate of dimerized $C_{18}$ fatty acids is substituted for an equivalent of toluene diisocyanate. There is obtained a prepolymer which is polymerizable by reaction with moisture.

What is claimed is:

1. A prepolymer compound reactable with moisture thereby forming a protective coating consisting essentially of the reaction product of an oxazoline corresponding to the formula:

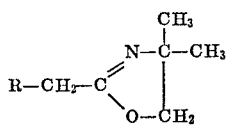

where R can be a saturated or unsaturated hydrocarbon radical of from 1 to 20 carbons or the group

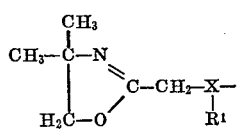

wherein X is any divalent, or trivalent saturated or unsaturated aliphatic hydrocarbon group, including straight chain or branched chain, of from 1 to 32 carbon atoms; when X is divalent, $R^1$ is hydrogen and when X is trivalent, $R^1$ is the group

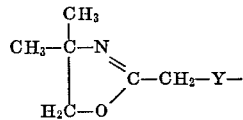

wherein Y is a saturated or unsaturated hydrocarbon radical of 16 carbon atoms, with an aromatic or an aliphatic diisocyanate in a ratio of about 1 equivalent of said oxazoline per 1 to 4 moles of said diisocyanate.

2. The composition of claim 1 wherein said prepolymer is the reaction product of a mono-oxazoline and toluene diisocyanate.

3. The composition of claim 1 wherein said prepolymer is the reaction product of a bis-oxazoline and toluene diisocyanate.

4. The composition of claim 1 wherein said prepolymer is the reaction product of a tris-oxazoline and toluene diisocyanate.

5. The composition of claim 1 wherein said prepolymer is the reaction product of a mixture of mono-, bis-, and tris-oxazolines and toluene diisocyanate.

6. The reaction product of claim 1 wherein said diisocyanate is an aliphatic diisocyanate.

7. The reaction product of claim 6 wherein said diisocyanate is the diisocyanate of dimerized $C_{18}$ fatty acids.

8. The reaction product of claim 1 wherein said diisocyanate is an aromatic diisocyanate.

9. The reaction product of claim 8 wherein said diisocyanate is methylene bis-(4-phenyl isocyanate).

References Cited

FOREIGN PATENTS 91,744  8/1968  France _____ 260—77.5

DONALD E. CZAJA, Primary Examiner

M. J. WELSH, Assistant Examiner

U.S. Cl. X.R.

260—33.6 UB